June 23, 1964  W. CASTEDELLO ETAL  3,138,057
APPARATUS FOR PROJECTING AND EDITING MOTION PICTURE FILM
Filed Aug. 5, 1959  6 Sheets-Sheet 1

INVENTORS
WILLIAM CASTEDELLO
BY WERNER K. BENDER
ATTORNEYS

June 23, 1964  W. CASTEDELLO ETAL  3,138,057
APPARATUS FOR PROJECTING AND EDITING MOTION PICTURE FILM
Filed Aug. 5, 1959  6 Sheets-Sheet 2

INVENTORS
WILLIAM CASTEDELLO
WERNER K. BENDER
BY
ATTORNEYS

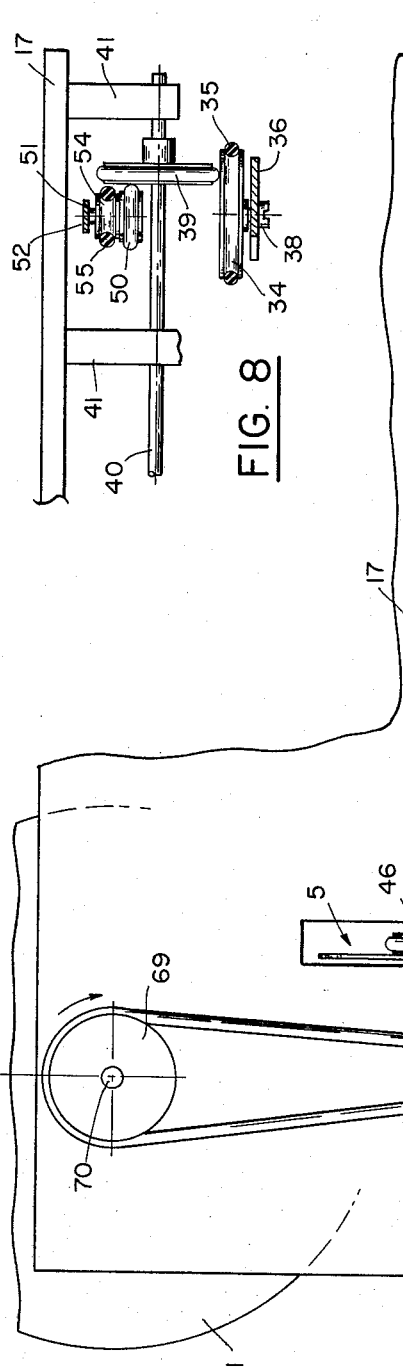

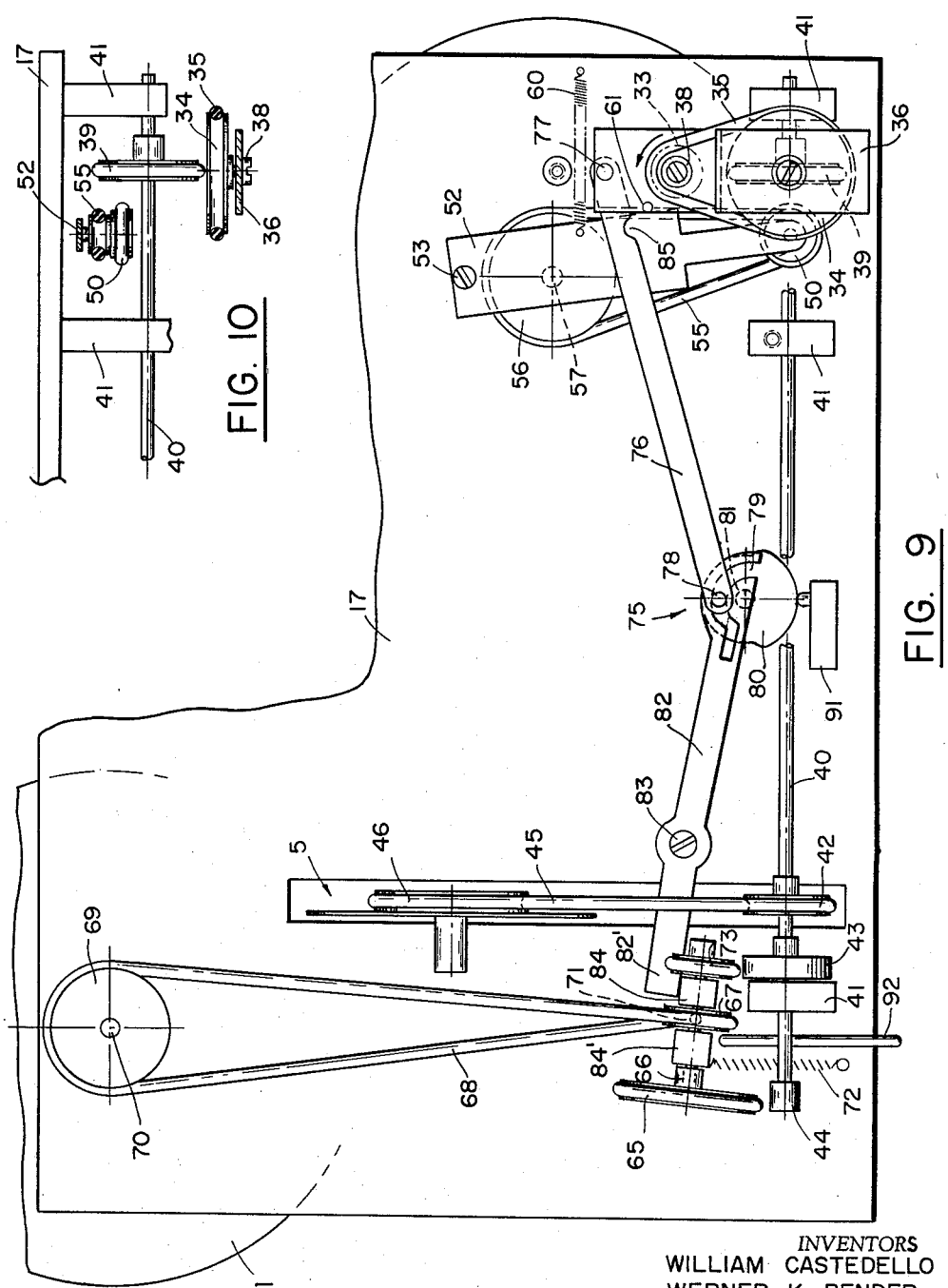

June 23, 1964  W. CASTEDELLO ETAL  3,138,057
APPARATUS FOR PROJECTING AND EDITING MOTION PICTURE FILM
Filed Aug. 5, 1959  6 Sheets-Sheet 5

INVENTORS
WILLIAM CASTEDELLO
WERNER K. BENDER
BY

ATTORNEYS

*INVENTORS*
WILLIAM CASTEDELLO
BY WERNER K. BENDER

ATTORNEYS

United States Patent Office 3,138,057
Patented June 23, 1964

3,138,057
APPARATUS FOR PROJECTING AND EDITING MOTION PICTURE FILM
William Castedello and Werner K. Bender, Plainville, Conn., assignors to The Kalart Company Inc., Plainville, Conn.
Filed Aug. 5, 1959, Ser. No. 831,904
14 Claims. (Cl. 88—16)

The present invention relates to apparatus for projecting motion picture film upon a surface separate from the apparatus, or upon a viewing screen on the apparatus for purpose of viewing and/or editing.

There are known and on the market numerous designs of film projectors and also numerous designs of motion picture editors. It is also known to mount the standard components of a projector and an editor in a common frame. However, projector-editor units as heretofore known are bulky, heavy and expensive as they include practically all the components of two separate apparatus.

Accordingly, it is the broad object of the present invention to provide a novel and improved projector-editor of the general kind above referred to, which is compact, light in weight and comparatively inexpensive.

A more specific object of the invention is to provide a novel and improved projector-editor in which most of the components of the optical system especially the more expensive components thereof, are common to the projector part and the editor part of the combination unit.

Another specific object of the invention is to provide a novel and improved projector-editor combination unit in which not only most of the optical components, but also most of the mechanical components such as the film drive are common to both the projector part and the editor part of the unit.

Still another object of the invention is to provide a novel and improved projector-editor combination unit which can be converted from operation as projector to operation as editor and vice-versa, by simply shifting a linking component in the common optical system from one position into another. Such shift can be effected without disassembly or use of tools.

It is also an object of the invention to provide a novel and improved projector-editor unit which includes means for regulating the rate of speed of the film transport and for reversing the direction of the film transport for rewind after completion of the projection of a film or reverting to selected frames during editing, the mechanism for such speed control and control of direction of the film transport being common to the projector part and the editor part of the combination unit.

A further object of the invention is to provide a novel and improved projector-editor combination unit in which the film is fully protected from the heat of the light bulb of the unit irrespective whether the apparatus is used as a projector or as editor. As is well-known, the heat generated by a bulb having the high light output required for projection is considerable and presents a problem when the film is standing still or is moving slowly as it often does during editing.

A still further object of the invention is to provide a novel and improved projector-editor combination unit in which the light bulb is mounted within a reflector housing which assures maximum utilization of the light output of the bulb and at the same time protects against accidental and dangerous contact with the hot bulb.

Other and further objects, features and advantages of the invention will be pointed out hereinafter and set forth in the appended claims forming part of the application.

In the accompanying drawing, several preferred embodiments of the invention are shown by way of illustration and not by way of limitation.

In the drawing:

FIG. 7 is an elevational view of the mechanism for controlling the speed and the direction of the film drive, the mechanism being shown in the position for forward drive.

FIG. 8 is a plan view of the right hand part of FIG. 7.

FIG. 9 is an elevational view similar to FIG. 7, but showing the drive mechanism in the position for stopping the drive.

FIG. 10 is a fragmentary plan view similar to FIG. 8.

Figure 1:
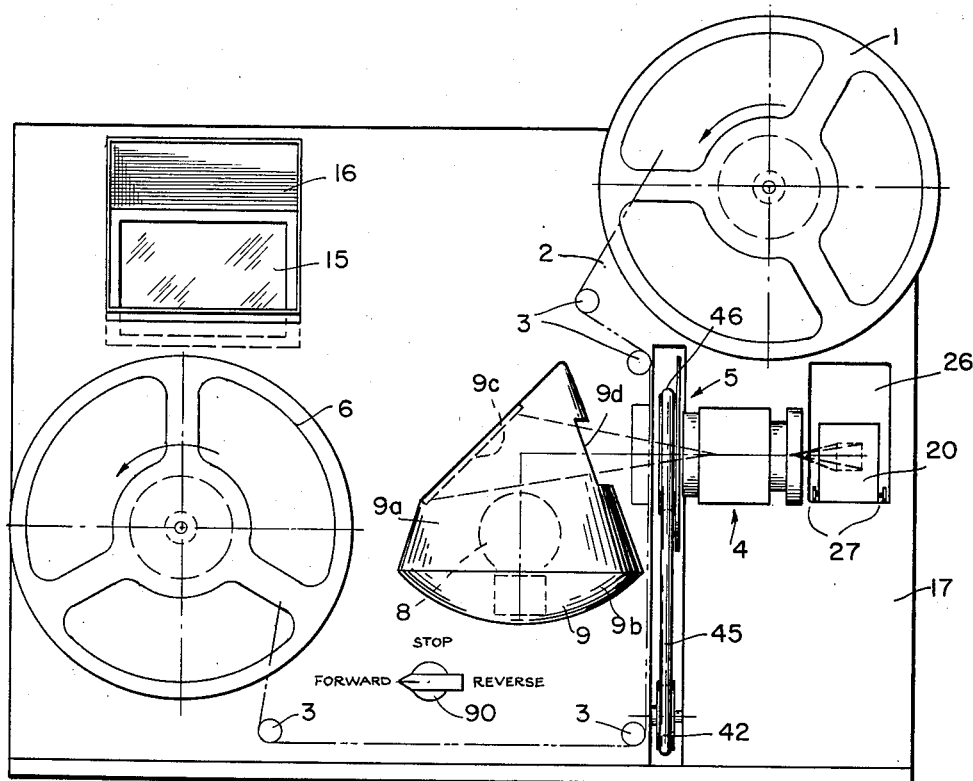
FIG. 1 is an elevational front view of the projector side of the apparatus, part of the apparatus cover being removed.

Referring now to the figures in detail, there is shown in FIG. 1 a diagrammatic front view of the entire apparatus. According to this figure, the motion picture film 2 to be projected or edited is stored in a supply reel 1. The film 2 is guided by guide means indicated as rolls 3, past an optical lens system 4 and a shutter assembly 5. The film is wound upon a take-up reel 6. Either reel may be driven by a motor 7 as will be more fully explained hereinafter. The light necessary for the operation of the apparatus is provided by a light bulb 8 of conventional design and suitable light output. The light bulb is mounted within a reflector casing 9 which will be more fully described hereinafter.

The lens system should be visualized as being of conventional design, that is, as including lens components capable of projecting successive frames of the film transported through the apparatus upon a screen on the apparatus or a screen or other surface remote from the apparatus proper. Similarly, the shutter assembly should be visualized as being of conventional design. It includes the usual Geneva or Maltese-cross arrangement 10. The blades of the shutter assembly are so spaced and dimensioned that standing images of the film frames are obtained. The general arrangement of the shutter assembly does not constitute part of the present invention and it should be assumed that the optical system in conjunction with the shutter assembly operate in the usual manner of a motion picture film projector. The drive for the shutter assembly is derived from the motor 7.

The apparatus as shown in FIG. 1 further comprises a viewing screen 15 which is shielded by means of an also conventional hood 16.

The focused light beam emanating from lens system 4 may either be directed, as already mentioned, upon a surface remote from the apparatus for use of the apparatus as a projector, or it may be deflected upon the viewing screen 15 for viewing or use of the apparatus as an editor.

All the components heretofore described are mounted in a common housing which is only partly shown. The most important part of the housing for the purpose of this invention is a partition wall 17 which mounts most of the components used in the projector part and the editor part of the apparatus.

Figure 4:
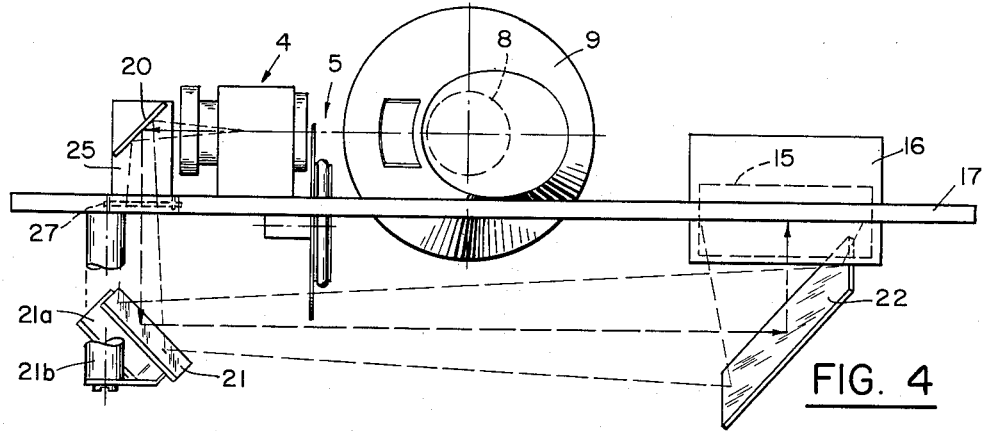
FIG. 4 is a diagrammatic plan view of the entire optical system in position for editing.

Referring now to FIG. 4, this figure shows most clearly the different paths of light involved. The optical elements used for deflecting the beam of light emanating from lens system 4 upon viewing screen 15 comprise a light deviating means 20 shown as a mirror, a light deviating means 21 also shown as a mirror and a third light deviating means 22 shown as a mirror. Obviously, appropriate prisms could also be used.

As is evident from FIG. 4, the light beam is deflected by mirror 20 upon mirror 21 and by mirror 21 upon mirror 22, which in turn will deflect the beam upon viewing screen 15 from the rear thereof as seen in FIG. 1. As is equally evident, removal of mirror 20 out of the path of the beam will cut off light from screen 15 and permit direct projection of the light beam upon a remote surface. In other words, mirror 20 constitutes a linking component between the lens system 4 and viewing screen 15 and its associated mirrors 21 and 22.

Figures 2, 3:
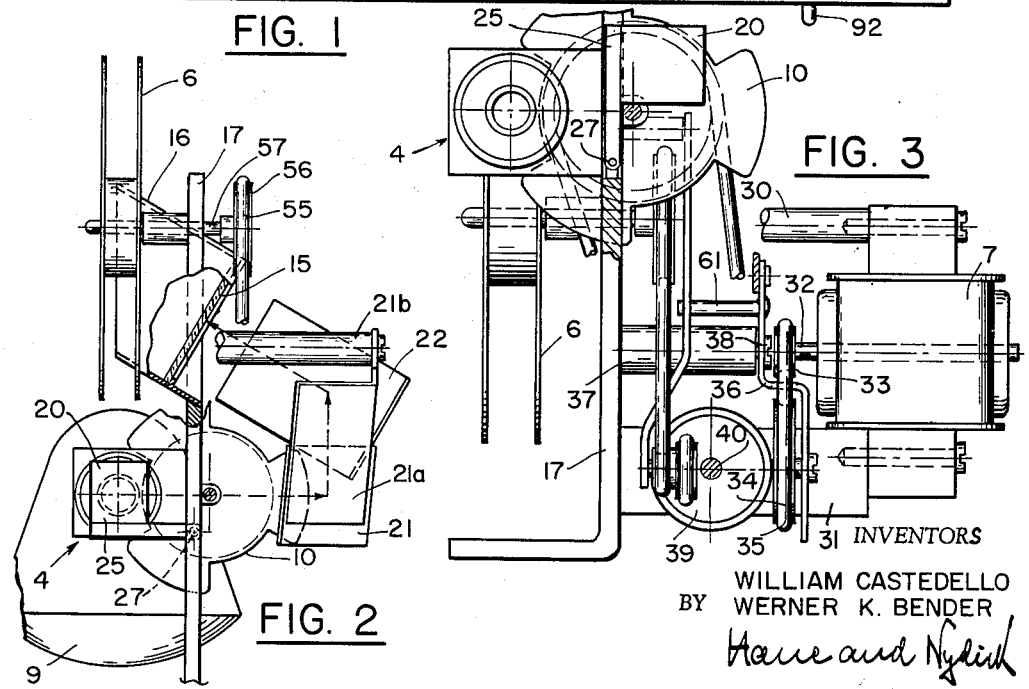
FIG. 2 is a fragmentary side view, partly in section, seen from the right side of FIG. 1 and showing the upper part of the apparatus, the optical system being in position for editing.
FIG. 3 is a similar fragmentary side view of the lower part of the apparatus, showing the optical system in position for projection.
Figure 5:
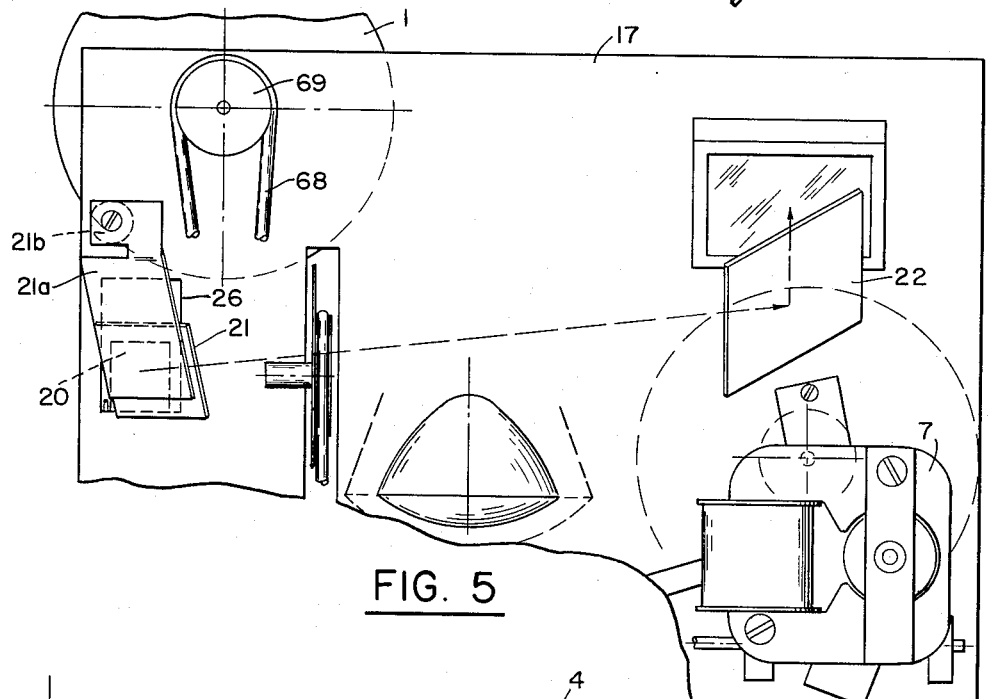
FIG. 5 is a fragmentary elevational side view of the apparatus seen from the side opposite to that of FIG. 1.
Figure 6:
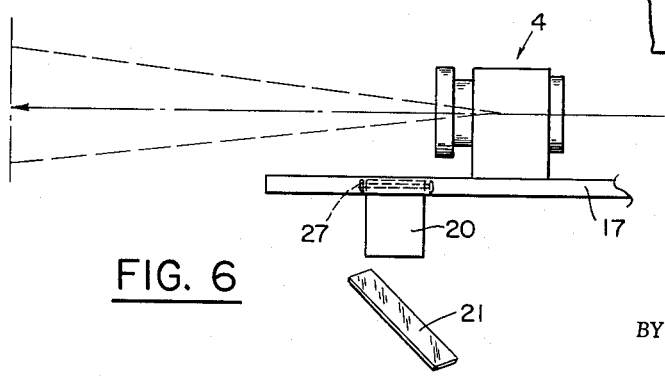
FIG. 6 is a diagrammatic detail view of the optical system shown in FIG. 4.

In order to move mirror 20 into and out of the path of the light beam projected by lens system 4, mirror 20 is mounted on a bracket 25 which is pivoted in a gate 26 cut in wall 17. Mirror 20 is shown in FIGS. 1, 2, 4 and 5 in its position intercepting the path of the light beam projected by lens system 4, and FIGS. 3 and 6 show the mirror withdrawn from the path of the light beam. FIG. 3 also shows that the mirror when tilted back into gate 26, will remain in the withdrawn position by its own weight. Mirror 21 may be mounted in any suitable manner; it is shown as being mounted on a bracket 21a secured to a stud 21b which in turn is fastened to wall 17. As is indicated in FIG. 5, bracket 21a is preferably partly slotted to permit convenient adjustment of the angular position of mirror 21 in reference to mirrors 20 and 22 by simply bending bracket 21a accordingly.

As is apparent from the previous description, the conversion of the apparatus from operation as projector to operation as editor and vice versa is effected by tilting mirror 20 either in the position of FIG. 3, or into the position of FIG. 4. The tilting of the linking mirror does not require any skill or tool but may be manipulated by the flick of a finger.

The Drive Assembly and Control Mechanism of the Apparatus

The drive for the film 2 and shutter assembly 5 is derived from motor 7. While the rotational direction and the r.p.m. of this motor remain unchanged, the apparatus according to the invention provides control means which permit a convenient control of the rate of speed and direction with which the film is moved through the apparatus. As a result of such speed and direction control, the apparatus is suitable for use either as a motion picture projector or a motion picture film editor. As is known, editing of the film requires that the frames of the film can be individually inspected to the extent desired by the operator and that the operator can also conveniently revert to frames which he may want to eliminate, or between which he may want to insert splices of titles, etc.

The drive and control means will now be described in detail.

As can best be seen in FIG. 3, motor 7 is mounted on frame wall 17 by means of two studs 30 and 31, or in any other suitable fashion. The motor shaft 32 seats a grooved drive wheel 33 which is drivingly coupled with a wheel 34 by means of a drive belt 35. The motor is omitted in FIGS. 7 through 12 to simplify the illustration, but its drive wheel 33 is indicated in dotted lines. Wheel 34 is rotatably supported on a cranked bracket 36 which is pivotally mounted on a stud 37 for instance, by means of a screw 38. Stud 37 in turn is also secured to frame 17. As is evident, bracket 36 can swing about its pivot point without varying the tension of drive belt 35. Wheel 34 which constitutes the driving or input wheel of the drive assembly is frictionally engaged on one of its faces by a driven wheel 39. Wheel 39 is seated on a shaft 40 which is journalled in bearings 41 which in turn are secured to frame 17. Shaft 40 seats three wheels 42, 43 and 44 of different diameter. Wheel 42 is coupled by a drive belt 45 to a wheel 46 which serves to rotate the shutter assembly. As mentioned before, the shutter assembly is conventional and does not constitute part of the invention.

One face of wheel 39 is frictionally engageable with a wheel 50 which is seated on a shaft 51 secured to a bracket 52. Bracket 52 is pivotally mounted on frame 17 by means of a pivot screw 53. Shaft 51 also seats a wheel 54 which is coupled by a drive belt 55 to a wheel 56 which in turn is seated on a spindle 57 which extends through frame 17 and seats the take-up wheel 6 in a conventional manner.

Figure 12:
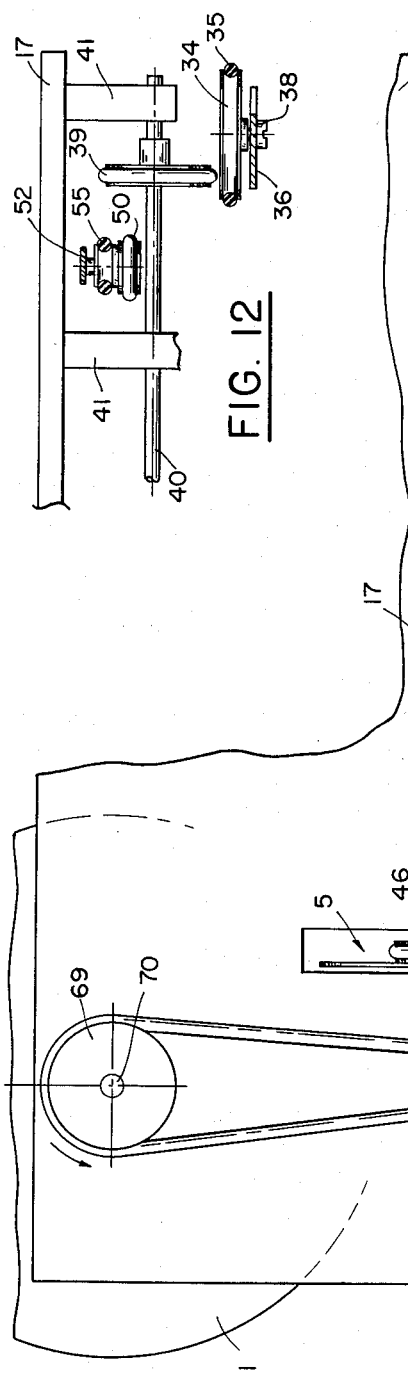
FIG. 12 is a plan view similar to FIGS. 8 and 10.
Figure 11:
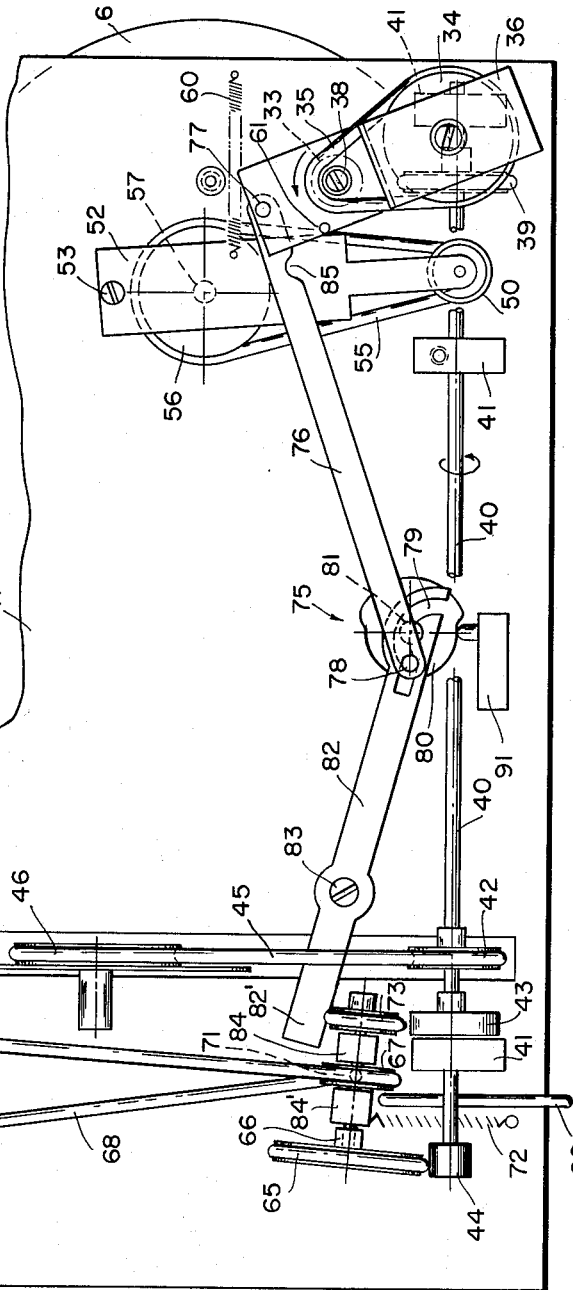
FIG. 11 is an elevational view of the drive control mechanism similar to FIGS. 7 and 9, but showing the mechanism in the position for reverse film drive.

As is evident, tilting of bracket 36 about its pivot 38 will correspondingly vary the radial distance between the point of engagement of wheel 39 with wheel 34 and the rotational axis of wheel 34. As is also evident, the radial distance and the location of the point of engagement on either side of the rotational axis control the speed and direction of the rotation transmitted by wheel 34 to wheel 39. FIGS. 8, 10 and 12 show three positions of wheel 39 in reference to wheel 34. According to FIG. 8, wheel 39 is located at approximately maximum distance to the right of the rotational axis. Accordingly, wheel 39 and with it shaft 40 are rotated at maximum speed and in clockwise direction as indicated in FIG. 8. The clockwise direction constitutes the forward direction for transport of the film in the exemplified embodiment. According to FIG. 10, wheel 39 occupies the center of wheel 34 which constitutes the stop position of the assembly and in FIG. 12, wheel 39 occupies a position of approximately maximum distance to the left of the rotational axis. Accordingly, wheel 39 and with it shaft 40 are rotated in counter-clockwise direction as is indicated in FIG. 11 by an arrow. Such counter-clockwise rotation constitutes the reverse or rewind direction of the drive assembly. Consequently, pivotal movement of bracket 36 permits adjustment of shaft 40 for any required rate of speed and direction.

As previously mentioned, wheel 39 also coacts with friction wheel 50. The bracket 52 supporting wheel 50 is urged by a spring 60 toward a position in which wheel 50 is in driving engagement with wheel 39. FIGS. 7 and 8 show wheel 50 in engagement with wheel 39. Accordingly, reel 6 is rotated in the direction indicated by the arrow in FIG. 7 which is the direction for take-up of film as is evident from FIG. 1. The rotational speed of wheel 50 is controlled by the rotational speed of wheel 39 as long as it is in engagement with that wheel. As can best be seen in FIG. 3, a pin 61 extending from bracket 36 engages bracket 52 when bracket 36 is tilted from the position of FIG. 7 toward the position of FIG. 11, that is, in any of the angular positions of bracket 36 between the position of FIG. 7 and the position of FIG. 11, wheel 50 is out of engagement with wheel 39. In other words, take-up reel 6 is positively driven in the forward direction only. As is evident, there is no need for a positive drive of the take-up wheel in the reverse direction and a drive in such direction would in fact interfere with the operation of the apparatus.

As previously mentioned, shaft 40 seats a drive wheel 44. This drive wheel coacts with a wheel 65 which is seated upon a shaft 66 also seating a wheel 67. Wheel 67 is coupled by a belt drive 68 with a wheel 69 mounted on a spindle 70 which seats supply reel 1. Shaft 66 is pivotal about a pivot pin 71 and a spring 72 urges shaft 66 into an angular position in which wheel 65 is in frictional driving engagement with wheel 44. Shaft 66 also seats a third wheel 73 which coacts with wheel 43 seated on shaft 40. As is apparent, only one of wheels 65 and 73 can engage wheel 44 and 43 respectively, and as is further apparent, engagement of either wheel 65 or 73 with the respective wheel will rotate reel 1, the direction of rotation being controlled by the direction of rotation of shaft 40. The relative diameters of wheels 44, 65, 43, 73 make it evident that the rate of rotation transmitted by wheels 43 and 73 is considerably higher than the rate of rotation transmitted by wheels 44 and 65. The fast rotation effected by wheels 43 and 73 is utilized for a Fast Rewind of the film as will be more fully explained hereinafter.

The angular position of bracket 36 which controls the rotation of shaft 40 and of wheel 50, is controlled by means of a control mechanism generally designated 75. The control mechanism comprises a lever 76 pivoted at one end to bracket 36 by means of a pivot pin 77 and rotatably engaged at the other end by a guide pin 78 riding in a curved guide track 79 and secured to a cam disc 80 rotatable about a pivot pin 81. Guide track 79 is provided at one end of a two-arm lever 82 pivotal about a pivot pin 83 extending from frame 17. The other arm 82' of lever 82 coacts with a bracket or arm 84 on the shaft 66 for wheels 65, 67 and 73. As is apparent, pivoting of lever 82 in counter-clockwise direction will seek to pivot the assembly on shaft 66 against the action of spring 72 so that wheels 65 and 44 are out of engagement. The linkage means formed by levers 76 and 82 is so arranged that lever end 82' will not move wheels 73 and 43 into driving engagement in any position of pin 78 in guide track 79. Referring now to the position shown in FIG. 9, as appears from this figure and also from FIG. 10, wheel 34 on bracket 36 does not transmit rotation to the input wheel 39 of the transmission system. Accordingly, both reels 1 and 6 and the shutter assembly 5 are stopped. Turning of cam disc 80 towards the position in which pin 78 moves toward the right hand end of the guide track 79 will gradually tilt bracket 36 from the position of FIG. 9 into the position of FIGS. 7 and 8. Furthermore, lever 82 is forced from the angular position of FIG. 9 into the angular position of FIG. 7 in which it releases the wheel assembly on shaft 66 sufficiently to permit some tilting of wheel 65 toward wheel 44 by the action of spring 72, but not sufficient to move wheels 65 and 44 into rotation transmitting engagement. As previously explained, wheel 50 and with it take-up reel are now rotated in the direction for forward transport of the film, the rate of speed being controlled by the selected angular position of bracket 36. Similarly, rotation of cam disc 80 into the opposite direction, that is, into the direction in which pin 78 moves towards the left hand end of guide track 79 will move bracket 36 from the position of FIG. 9 toward and into the position of FIG. 11. Lever 82 will also be tilted and in the same direction as it was tilted when bracket 36 was turned from the position of FIG. 9 into the position of FIG. 7. The tilt is now sufficient to move lever arm 82' clear of bushing arm 84 so that spring 72 will pull wheel 65 into friction transmitting engagement with wheel 44. Accordingly, supply reel 1 is rotated in the direction required for rewinding the film. To permit the pivotal motions of lever 76 in reference to bracket 36 without interference with pin 61 extending from bracket 36, lever 76 is notched at 85. The notch is so located that it will be occupied by pin 61 when bracket 36 is in the position of tilt shown in FIG. 7.

Shaft 81 of disc 80 mounts on the front side of the apparatus frame a control knob 90. This knob is shown in FIG. 1 in which are also indicated the positions into which the knob has to be moved to control the speed and direction of the rotational components of the apparatus.

The cam surfaces of disc 80 serve to control a miniature switch 91, for instance a switch of the type known as Micro-switch, for a purpose which will be more fully explained hereinafter.

In order to effect a Fast Rewind of the film, knob 90 is placed in the position marked "Reverse." In addition, wheels 43 and 73 must be brought into driving frictional engagement. This is effected by means of a push rod 92 which is mounted slidable in frame 17, or in any other convenient location. One end of this rod protrudes from the apparatus and the other end coacts with a sleeve or bushing 84' on shaft 66. As is evident from FIG. 9, pushing inwardly of rod 92 forces wheel 73 into engagement with wheel 43 when and while the rod is depressed. As soon as the rod is released, spring 72 will again slightly separate wheels 43 and 73 as is shown in FIG. 9. The provision of rod 92 permits a convenient and accurate control of the Fast Rewind.

Figure 13:
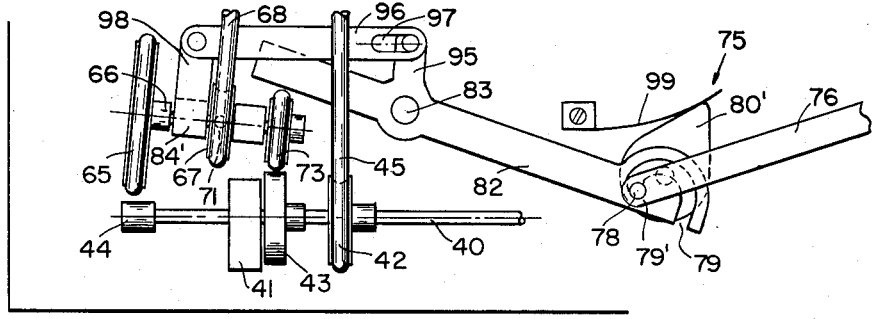
FIG. 13 is a fragmentary view of a control mechanism for a Fast Rewind drive of the film.
Figure 14:
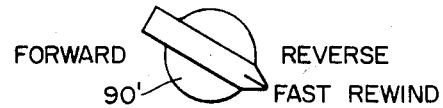
FIG. 14 is a detail view of the control knob for the mechanism of FIG. 13.

The control mechanism 75 can also be so arranged that the Fast Rewind can be operated by means of a further position of knob 90'. Such arrangement is shown in FIGS. 13 and 14.

As is apparent, the arrangement of driving and driven wheels is similar to that shown in FIGS. 7 through 12, but push rod 92 and spring 72 are omitted. The position of tilt of shaft 66 for moving wheels 43 and 73 into and out of engagement is positively controlled by means of an extension 95 linked to a lever 96 by means of an elongated slot 97. Lever 96 in turn is linked to an arm 98 extending from sleeve 84'. Guide track 79 is extended at 79' sufficiently to permit pulling of shaft 66 into a position of tilt such that wheel 73 is in driving engagement with wheel 43 when pin 78 occupies slot portion 79' as is shown in the figure. Pin 78 can be forced into the position 79' by turning disc 80' beyond the position marked "Reverse" indicated in FIG. 14 and into the position marked "Fast Rewind." A spring 99 may be provided which urges disc 80' out of the position in which pin 78 occupies the slot position 79', that is, the apparatus will be set for "Fast Rewind" only when and while knob 90' is manually held in the position of FIG. 14.

*The Power Supply of the Apparatus*

Figure 15:
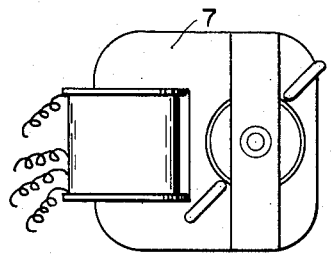
FIG. 15 is a diagrammatic view of the drive motor of the apparatus.

As previously stated, the forward and the reverse drive for the film and also the rotation of the shutter assembly are derived from motor 7. This motor is shown in FIG. 15 as a shaded pole motor. As is also shown in this figure and further shown in FIGS. 16 and 16A, the field winding of the motor is tapped and the taps are used to obtain the necessary potential for the light bulb of the apparatus.

Figure 16:
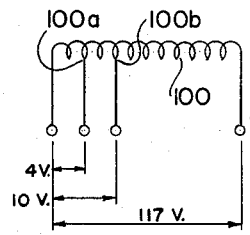
FIG. 16 is a circuit diagram of the tapped field winding of the motor.
Figure 16A:
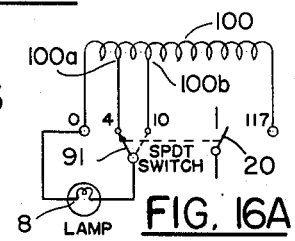
FIG. 16A is a circuit diagram of a switching system for controlling the winding taps of the motor.

As is evident, maximum light output is desired when the images are projected upon a screen remote or separate from the apparatus. Less brilliancy is sufficient when the projected images are deflected upon viewing screen 15, either for purpose of viewing or editing. When the frames of the film are viewed on screen 15, it is generally desirable that the film is transported slower and it may even temporarily be at a standstill. This creates the problem of overheating and thereby damaging the film. This problem is reduced, or even entirely eliminated by reducing the light output of the bulb when the film is viewed on viewing screen 15 thereby correspondingly reducing the heat generated by the light bulb which must be dissipated. As is indicated in FIG. 16, the field winding 100 of the motor has two intermediate taps 100a and 100b. The full length of the field winding is used to operate the motor for transporting the film and operating the shutter assembly. The tap marked 10 volt supplies full light output and the tap marked 4 volt supplies the reduced light output. The miniature switch 91 which is controlled by the cam surfaces of disc 80 serves to switch the bulb connection from one tap to the other as is shown in FIG. 16A depending upon the angular position of disc 80. The position of disc 80 is a function of the desired speed of the film transport and the cam surfaces of disc 80 are correlated with the film transport rate at which it is desirable to change the light output from full output to reduced output and vice versa. Similarly, the switching of switch 91 can also be coupled with the movement of tiltable mirror 20.

Figure 17:
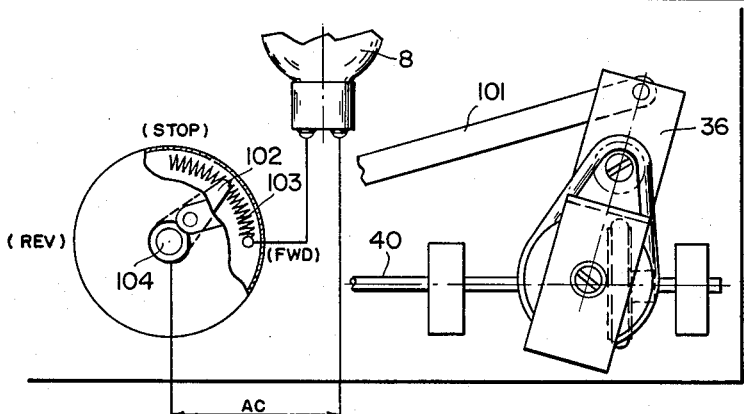
FIG. 17 is a fragmentary diagrammatic view of the control mechanism of FIGS. 7 through 12, modified to effect an automatic control of the voltage fed to the light bulb of the apparatus.

FIG. 17 shows a modification of the control of the light output as a function of the rate of the film transport. According to FIG. 17, a lever 101 is linked on one end to pivotal bracket 36 and on the other end to the sliders 102 of a rheostat 103. Slider 102 is rotatable about a pin 104. The rheostat is connected in the lamp circuit. As has been previously explained, the angular position of bracket 36 controls the rate of speed of the film transport whereby the potential supplied to the light bulb and with it the light output are a function of the rate of speed of the film transport. In the arrangement according to FIG. 17, the bulb may be connected directly to the available power supply and a tapping of the field winding of the motor of the apparatus is thus not necessary.

The Light Unit Assembly

As can best be seen in FIG. 1, the light bulb is mounted in a reflector casing generally designated by 9. This casing has an upper, generally conical part 9a and a lower part 9b which constitutes a portion of a spherical configuration. All the inner surfaces of housing 9 are suitably polished. The light output of bulb 8 is concentrated to a substantial proportion upon a mirror 9c and reflected through a gate 9d toward the lens system 4 of the apparatus. It has been found that the reflector housing as shown utilizes a very high percentage of the total light output of the bulb and at the same time avoids any undesirable glare.

Operation of the Apparatus

The operation of the apparatus will be generally self-evident from a review of the drawings and the previous description. In FIGS. 1 and 3, the apparatus is set for showing a motion picture film on a screen separated from the apparatus proper. When it is desired to change from such presentation of the film to a viewing of the film on viewing screen 15, all that is necessary is to flip linking mirror 20 from the position of FIG. 3 into the position of FIG. 2. (See also FIG. 4 in this connection.) The rate of speed of the film transport can be slowed down from the full rate of speed by gradually turning knob 90 from the "Forward" position toward the "Stop" position. Similarly, the film can be rewound by turning the knob gradually from the "Stop" position toward the "Reverse" position. As the knob approaches the "Reverse" position, the rewind speed will gradually increase. As appears from the previous description, any desired frames can be slowly moved past viewing screen 15 in the forward or reverse direction thereby permitting a convenient editing of the film. With equal convenience, the film can be transported at full or normal speed for viewing on screen 15 by simply changing the position of knob 90. If it be desired to revert to projection of film on a remote screen, mirror 20 is simply flipped out of its position intercepting the path of the light beam.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. An apparatus for selectively projecting motion picture film upon a surface separate from the apparatus and upon a viewing screen on the apparatus, said apparatus comprising guide means for guiding motion picture film to be projected through the apparatus, an electric light unit for directing a beam of light through successive frames of film guided through the apparatus, optical means including rotary shutter means interposed in the path of said beam for making viewable on said separate surface a sequence of standing images of successive frames of film guided through the apparatus, a viewing screen, light deviating means incorporated in the apparatus for deflecting the beam to render said standing images viewable upon said viewing screen, said deviating means being mounted pivotal into and out of a position in the path of the beam, and switch means controlling the light output thereof in response to said light-deviating means being set for deflecting the beam of light upon said viewing screen.

2. An apparatus for selectively projecting motion picture film upon a surface separate from the apparatus and upon a viewing screen built in the apparatus, said apparatus comprising guide means for guiding motion picture film to be projected through the apparatus; an electric light unit for directing a beam of light through successive frames of film guided through the apparatus; optical means including rotary shutter means interposed in the path of said beam for making viewable on said separate surface a sequence of standing images of successive frames of film guided through the apparatus; a viewing screen included in the apparatus; rotary drive means for moving the film through the apparatus and rotating said shutter means, transmission means for transmitting the rotation of the drive means to the film and shutter means; control means for controlling the rate and direction of transmission for said transmission means, said control means including a pair of friction wheels included in said transmission means, one of said friction wheels being a driving wheel driven by said drive means and the other a driven wheel, the driving wheel engaging one face side of the driven wheel in rotation transmitting frictional engagement and being displaceable along said face side, and actuating means coupled with said first displaceable wheel to vary the position thereof in reference to the rotational axis of the driven wheel, thereby correspondingly varying the rotational speed and direction of the driven wheel; said transmission means including a spindle for receiving a film supply reel, a spindle for receiving a take-up reel, a second displaceable wheel movable into and out of driving engagement with said first displaceable wheel, the direction and rate of rotation of said second displaceable wheel being controlled by the position of the first displaceable wheel, said second displaceable wheel being drivingly coupled with said spindle for the take-up reel, a rotary shaft fixedly seating said driven wheel, a second wheel fixedly seated on said shaft, a third displaceable wheel movable into and out of engagement with said second fixed wheel, the direction and rate of rotation of the third displaceable wheel being also controlled by the position of the first displaceable wheel, said third displaceable wheel being drivingly coupled with said spindle for the supply reel, and light-deviating means for deflecting the beam to render said standing images viewable on said viewing screen, said deviating means including a pivotal beam-deflecting element movable into and out of position intercepting the beam after emanating from said optical means, and stationary beam-deflecting means, said viewing screen, said optical means and said pivotal and stationary deflecting means being disposed in an optical relationship with each other such that said pivotal element when in the beam-intercepting position constitutes an optical link between said viewing screen and said optical means.

3. An apparatus accordng to claim 2 and also comprising a mounting frame, said optical means and said light unit being disposed on one side of said frame and said drive means, control means and stationary deflecting means being disposed on the other side of the frame, said frame including an aperture in which said viewing screen is fitted and a gate in which said pivotal deflecting element is mounted for pivotal movement into and out of its beam intercepting position.

4. An apparatus according to claim 2 wherein said first displaceable driving wheel is movable along a diameter of the driven wheel to either side of the rotational axis of said driven wheel whereby the rotational speed of the driven wheel is variable between zero speed and a maximum speed in either direction of rotation.

5. An apparatus according to claim 2 and also comprising a pivotally mounted support member supporting the first displaceable wheel, the angular position of said support member controlling the position of said first displaceable wheel in reference to the rotational axis of the first wheel fixed on the shaft, linkage means connected to said support member, and actuating means coacting with said linkage means for controlling the angular position of said support member by actuating the linkage means.

6. An apparatus according to claim 5 wherein said linkage means comprise two levers, one end of one lever being pivotally connected to said support member and one end of the other lever controlling the position of said third displaceable wheel in reference to the second fixed wheel, the other ends of the two levers being linked to each other by a follower pin rotatably extending into one lever and riding in a guide track formed at the end of the other lever, and wherein said actuating means comprise a rotary member mounting said pin, the rotational position of said rotary member controlling the position of the pin in said guide track and said pin position controlling the positions of the levers relative to each other thereby controlling the angular position of support member.

7. An apparatus according to claim 6 and further comprising a third wheel fixedly seated on said rotary shaft, a fourth displaceable wheel movable into and out of engagement with the third fixed wheel, said fourth displaceable wheel being mounted for joint rotation with the third displaceable wheel, spring means urging the fourth displaceable wheel and the third fixed wheel out of engagement, and second actuating means for moving the fourth displaceable wheel into engagement with the third fixed wheel thereby imparting rotation of the rotary shaft to the supply spindle.

8. An apparatus according to claim 7 wherein the third and the fourth displaceable wheel are fixedly seated on a shaft mounted pivotal about an intermediate point, and a further wheel is fixedly seated on said shaft at the pivot point thereof, said further wheel being drivingly coupled with said spindle for the supply reel, said shaft being tiltable by engagement with the respective end of said other lever for moving the third displaceable wheel and the second fixed wheel out of driving engagement against the action of said spring means and said shaft being also tiltable by actuation of said second actuating means for moving the fourth displaceable wheel into driving engagement with the third fixed wheel against the action of said spring means.

9. An apparatus according to claim 8 wherein said actuating means comprise a longitudinally slidable push rod coacting with said shaft.

10. An apparatus according to claim 8 wherein said second actuating means comprise a link included in said linkage means, said link coacting with said shaft and being controlled as to its position by the position of said two levers relative to each other which in turn is controlled by the position of the rotary member of said first actuating means.

11. An apparatus according to claim 2 wherein said rotary drive means comprise an electric motor having a tapped field winding, circuit means connecting the tapped portions of the field winding in circuit with said light unit, and switch means included in said circuit means for connection of different portions of the field winding with the light unit thereby correspondingly varying the potential fed to the light unit and hence the light output thereof.

12. An apparatus according to claim 11 wherein said switch means are controlled by said control means to reduce the light output by the reduced rate of transmission of said transmission means.

13. An apparatus according to claim 2 wherein said rotary drive means comprise an electric motor having a tapped field winding, circuit means connecting the tapped portions of the field winding in circuit with said light unit, and resistance means included in said circuit means, said resistance means being controlled by said control means to vary the potential fed to the light unit in accordance with the rate of transmission of said transmission means thereby correspondingly varying the light output of the light unit.

14. An apparatus according to claim 1 wherein said light unit comprises a housing having an inner plane light reflecting surface, an inner spherically curved light-reflecting surface and a light gate, said curved reflecting surface concentrating the light output upon the plane reflecting surface of the housing, said plane reflecting surface, said light gate and said optical means being disposed in optical alignment whereby a concentrated beam of light emanates from said light gate.

References Cited in the file of this patent

UNITED STATES PATENTS

| | | |
|---|---|---|
| 1,209,492 | Power | Dec. 19, 1916 |
| 2,049,944 | Carpenter | Aug. 5, 1933 |
| 2,165,419 | Schubert | July 11, 1939 |
| 2,168,761 | Caldwell | Aug. 8, 1939 |
| 2,299,657 | Rystedt | Oct. 12, 1940 |
| 2,813,453 | Browder | Nov. 19, 1957 |